Patented Feb. 2, 1932

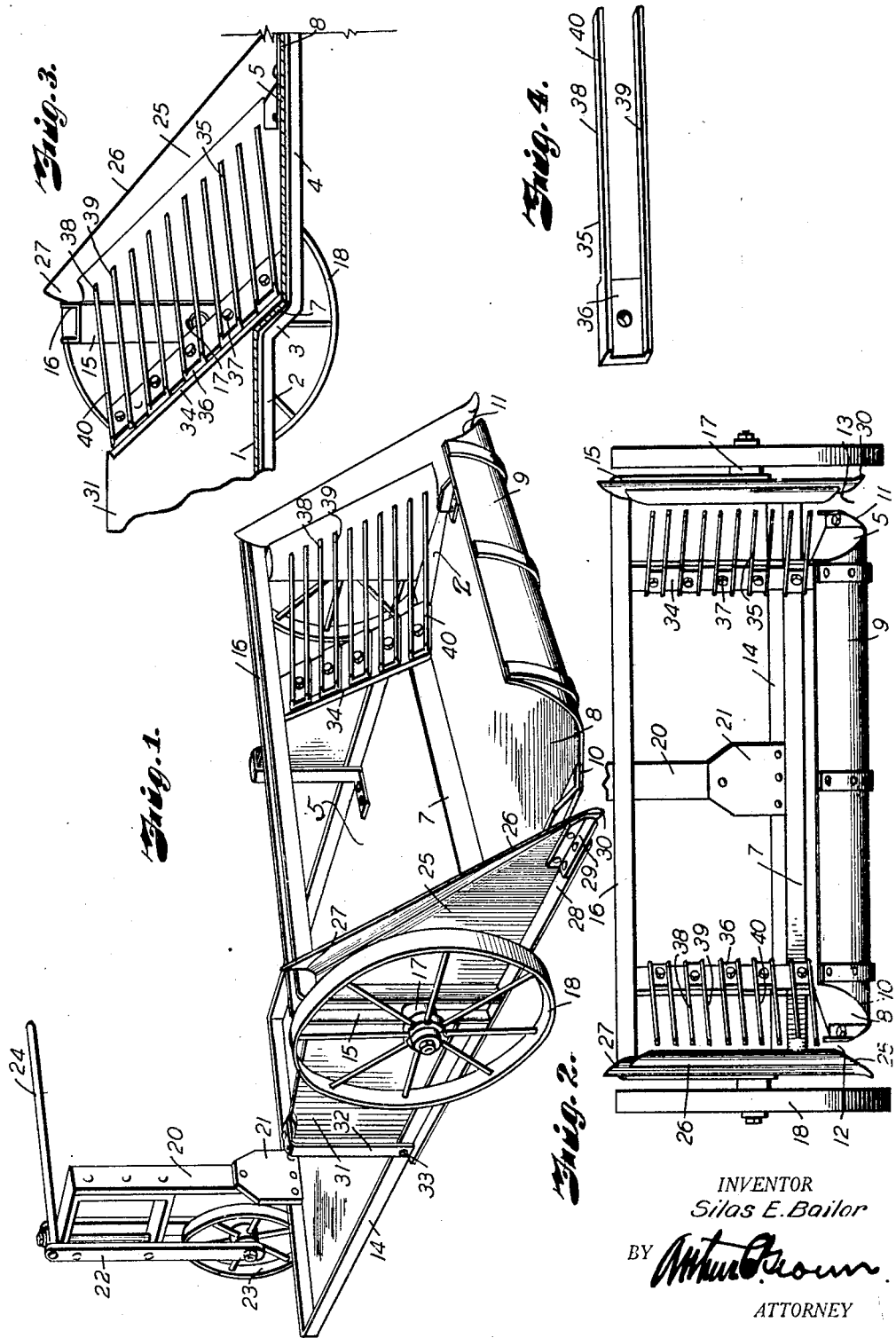

1,843,190

UNITED STATES PATENT OFFICE

SILAS E. BAILOR, OF DILL, OKLAHOMA

COTTON HARVESTER

Application filed July 12, 1930. Serial No. 467,518.

My invention relates to cotton harvesters and like machines adapted to engage bolls or the like on standing bushes and strip the bolls from the bushes.

Cotton harvesting apparatus ordinarily includes a slotted guide in which a cotton bush is engaged while the frame passes to strip bolls from the bush, the stems and leaves being crowded with the stalks and tending to be dragged from the stalks with the bolls.

The principal objects of my invention therefore, are to provide a cotton or like harvester adapted to distribute and spread the stems while gathering the bolls, and collect bolls comparatively free from leaves and sticks.

In accomplishing these and other objects of my invention, I have provided improved details of structure, the preferred form of which is illustrated in the accompanying drawings, wherein:

Fig. 1 is a perspective view of a cotton harvester embodying my invention.

Fig. 2 is a front elevation of the harvester.

Fig. 3 is a fragmentary perspective and partly sectional view of cotton stalk receiving portion of the harvester, including boll stripping fingers.

Fig. 4 is a detail perspective view of one of the stripping fingers.

Referring in detail to the drawings:

1 designates generally a frame including sills or bars 2 having inclined portions 3 and downwardly offset front portions 4 upbent at their front ends and supporting a pan or bottom plate 5 conforming to the contour of the sills to provide a sloping seat 7 and front portion 8 having an upwardly curved front edge 9 and longitudinal edge portions 10 and 11 incut and curved respectively to form slots 12 and guide mouths 13 for purposes presently disclosed.

Fixed to a vertical rim 14 on the edges of the rear portion of the bottom plate are vertical legs 15 of an arch member 16 comprising a channel having flanges directed outwardly to receive bearings 17 fixed to the arch legs for front wheels 18 whereby the front end of the device is supported.

The upstanding edge flange extends around the rear portion of the bottom plate, and a supplemental frame 20 which may be anchored to said flange by a plate 21 pivotally supports a steering wheel bracket 22 having a wheel 23 for supporting the rear end of the device, and operated by a rudder 24 for guiding the device.

Fixed to the inner faces of the arch legs are vertical aprons 25 projecting forwardly in spaced relation with the edges 10 of the bottom plate to produce the slots 12, and from the edge portions 11 to form the guide mouths 13, and having upwardly rearwardly inclined vertical front edges curved outwardly to provide guide wings 26 for guiding cotton bushes into the slots when the device moves along rows of bushes as presently described. The upper ends of the wings are extended to form ears 27 bearing against the transverse body of the arch.

Exterior stiffening strips or flanges 28 fixed to the lower edge of the aprons by angles 29 reenforce forwardly projecting curved points 30 of the aprons, and extend along the rear portion of the bottom plate to assist in supporting the arch.

Side plates or rear aprons 31 fixed to the bottom plate rim and braced by bars 32 having bent ends fixed to the rim and bottom plate by fastening means such as bolts 33, have inbent front ends and inclined front end edges provided with inwardly directed flanges 34 having lower ends overlying the inclined seat formed by the portion 7 of the bottom plate, to receive equally spaced slotted bars 35 having web portions 36 fixed to the flanges 34 by bolts 37. The bars 35 thus form pairs of spaced fingers 38 and 39 projecting laterally in inclined planes toward the vertical aprons.

The ends of the fingers are substantially aligned with the edges 10 of the bottom plate, to provide upward extensions of the slots 12 and permit the aprons and fingers to pass bushes without engaging the relatively rigid stalks thereof.

The fingers have bevel front end edges 40 for facilitating sliding movement thereof over the stalks of rooted bushes.

The slotted bars are adapted to be located to form relatively equally spaced parallel substantially horizontal prongs having channels or recesses of substantial lateral extent into which the stems or branches of cotton bushes may pass while the stalks are located in and in effect move between the ends of the teeth and the aprons.

The fingers are preferably spaced sufficiently to retain the bolls of cotton containing the cotton fibre and for this purpose are spaced approximately 7/8 of an inch apart.

The fingers are preferably plate-like strips arranged horizontally so that their thin edges are presented to the bushes while affording substantial strength to resist the strain of retaining the bolls while the frame moves away from the rooted bushes, and permitting use of relatively thin webs for attaching the fingers to the supporting structure.

In using the device the sets of fingers or slotted bars form the teeth of combs having heads spaced inwardly from the slot edges 10, and the supporting bars are spaced sufficiently from the apron to permit the boll-supporting stems to extend substantial distances from the stalks of bushes, whereby the leaves and stems may pass freely without compression or crowding while the bolls are distributed among the several retainers formed by adjacent fingers. Each boll therefore, will be separately engaged and when the frame passes over the bushes, the bolls will all fall into the trough-like bottom and relatively small amounts of leaves and stems will be dragged from the bushes by operation of the device.

What I claim and desire to secure by Letters Patent is:

1. A cotton harvester including a wheeled frame, a bottom plate, a vertical apron spaced from said plate to admit stalks located in the path of the frame, and a series of relatively long substantially parallel bars fixed to the frame and extending horizontally toward said apron having points in a line inclined rearwardly and upwardly from the bottom plate and spaced from said apron to form a channel for said stalks, said bars acting to distribute stems of said stalks laterally from the apron and strip bolls from said stems.

2. A cotton harvester including a wheeled frame, a bottom plate having a downwardly offset front portion and an upturned front edge incut at one side to form a recess, a vertical apron having an outwardly curved front edge portion spaced from said recess to form a guide for stalks located in the path of the frame, and a series of relatively long substantially parallel bars fixed to the frame and extending toward said apron having spaced points spaced from said apron for distributing branches of said stalks laterally from the apron and strip bolls from said branches.

3. A cotton harvester including a wheeled frame, a bottom plate having a downwardly offset front portion and an upturned front edge in-cut at both side edges to form recesses, a vertical apron adjacent each recess having an outwardly curved front edge portion spaced from said recess to form guides for stalks located in rows spaced correspondingly to said recesses, and a series of substantially parallel bars fixed to the frame and extending toward each of said aprons having spaced points spaced from said aprons for distributing branches of the stalks laterally from the aprons and stripping bolls from said branches.

4. A cotton harvester including a wheeled frame, a bottom plate having an up-turned front edge in-cut at both side edges to form recesses, a vertical apron adjacent each recess having an outwardly curved front edge portion spaced from said recess to form guides for stalks located in rows correspondingly to said recesses, and a series of substantially parallel bars fixed to the frame and extending horizontally toward each apron, said bars having points in a line inclined rearwardly and upwardly from the bottom plate and spaced from said aprons to form channels for said stalks, said bars acting to distribute stems of said stalks laterally from the aprons and strip bolls from said stems.

In testimony whereof I affix my signature.

SILAS E. BAILOR.